United States Patent [19]

Caretta

[11] 4,360,397
[45] Nov. 23, 1982

[54] PROCESS FOR THE MANUFACTURE OF RADIAL TIRES

[75] Inventor: Renato Caretta, Varese, Italy

[73] Assignee: Societa Pneumatici Pirelli S.p.A., Milan, Italy

[21] Appl. No.: 242,149

[22] Filed: Mar. 9, 1981

[30] Foreign Application Priority Data

Mar. 18, 1980 [IT] Italy .............................. 20716 A/80

[51] Int. Cl.³ ........................ B29H 17/10; B60C 9/20
[52] U.S. Cl. ................................ 156/134; 152/330 R; 152/361 DM; 152/361 R
[58] Field of Search ................... 156/110 R, 133, 134, 156/123, 124, 126; 152/330 R, 361 R, 361 FP, 361 DM

[56] References Cited

U.S. PATENT DOCUMENTS 3,960,628  6/1976  Snyder ................................ 156/133
4,146,415  3/1979  Caretta et al. ....................... 156/133

FOREIGN PATENT DOCUMENTS 1299622  6/1962  France ......................... 152/361 FP Primary Examiner—Edward C. Kimlin
Assistant Examiner—Lois E. Boland
Attorney, Agent, or Firm—Stevens, Davis, Miller & Mosher

[57] ABSTRACT

A process for manufacturing radial type motor vehicle pneumatic tires is provided in which an annular reinforcing structure is disposed on a toric carcass. The reinforcing structure is built up of two layers of metallic cords crossed with each other, and an additional third layer of heat shrinkable textile cords that form, with the longitudinal direction of the tire, an angle which is not zero and is a smaller angle than that of the underlying cords.

The third textile layer is applied by butt-joining its respective opposite ends along a straight line parallel to the metallic cords of the underlying metallic layer.

8 Claims, 6 Drawing Figures

PROCESS FOR THE MANUFACTURE OF RADIAL TIRES

The present invention relates to a manufacturing process for pneumatic tires having a radial carcass, a tread and an annular reinforcing member between the carcass and tread, and more particularly, the invention relates to a manufacturing process for radial tires wherein the annular reinforcing member has three layers of cords, two metallic and one radially outermost layer of a textile fabric that tends to shrink in length when exposed to heat.

Processes are known for manufacturing tires of the type described above wherein the annular reinforcing member has two layers comprising metallic cords that are parallel to each other in each layer and crossed with respect to the cords of the other layer, with the cords being inclined with respect to the longitudinal direction at angles between 5° and 30°, and a third layer, radially outside the first two layers, formed by textile cords (nylon, for example) that are parallel to each other and disposed in the longitudinal direction.

One of the processes comprises the step of shaping the carcass into a toric form on an expandable drum, fitting on the carcass the reinforcing structure comprising textile cords extended in the longitudinal direction and overlapped with each other in the end portions, applying the tread band, and vulcanizing the carcass in its mold.

In the finished tire, this involves the drawback of a non-uniform disposition of the metallic and textile cords in the reinforcing layers between the carcass and the tread.

A process is disclosed in Italian Pat. No. 1,017,287 which comprises shaping the carcass on an expandable drum, transforming the carcass from its cylindrical configuration into a first toric configuration, applying to the carcass two metallic layers, shaping the carcass into a second toric configuration with the two metallic layers, applying around the metallic layers a layer of nylon cords in the longitudinal direction with the length longer than the equatorial development of the radially outermost metallic layer, in such a way that the ends of the textile layer overlap sufficiently so that the layer can resist the pressures at play, applying the tread band, and finally, the further step of vulcanizing the tire in a pressurized mold.

Tires manufactured according to the disclosed process manifest, as is pointed out and explained in detail in the Italian patent, a pre-loaded elastic state in the longitudinal textile cords, in such a way as to promptly react to any type of stress, and besides, they have good road-behavior.

Nevertheless, forced by the present tendency in the market, and by progress which tends to obtain, at a parity to the resistance of stresses on the tire during exercise, tires which are even more perfect, especially from the point of view of riding comfort at high speeds, further modifications of the manufacturing process are considered necessary to obtain, in the finished tire, improved performance, in the sense that has been previously specified.

In particular, it has been established that in tires constructed in accordance with the above-described process, although performing well, the cords of the two metallic layers are not under uniform tension, and furthermore, owing to the nonuniformities, geometrical in this instance, determined by the extension and by the thickness of the overlapping ends of the textile cord layer. It has also been established that troublesome vibrations, are periodically transmitted from the ground to the vehicle during tire running.

It is an object of this invention to provide a process for making a pneumatic tire for a motor vehicle wheel having, between a radial carcass and a tread, an annular reinforcing member or breaker having two layers of metallic cords and a radial outer layer of textile cords which is devoid of the disadvantages of the tire disclosed in the aforesaid Italian patent. Another object of the invention is to provide a process for making a radial tire having a breaker member comprising two layers of metallic cords and a radially outer layer of textile cords having improved responsiveness to demands made upon it by the vehicle upon which it is mounted as well as improved overall road behavior. A more specific object of the invention is to provide a process for making a radial tire which provides improved riding comfort especially at high speeds. A more specific object of the invention is to provide a process for making a pneumatic tire for a wheel of a motor vehicle having a radial carcass, a tread band and between the carcass and tread band an annular reinforcing member having two metallic cord layers and a radially outward textile cord layer in which the cords of the metallic layers of the annular reinforcing member are under substantially uniform tension.

Other objects will become apparent from the following description with reference to the accompanying drawing wherein FIG. 1 is a perspective view of a linear segment of one embodiment of the invention with parts broken away to show the annular reinforcing member;

Figure 1:
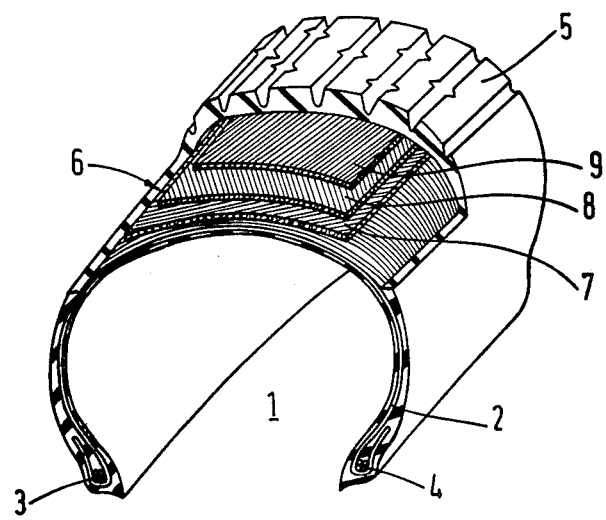

The foregoing objects are accomplished in accordance with this invention, generally speaking, by providing a process for making a pneumatic tire for a motor vehicle wheel having between a tread band and radial carcass an annular reinforcing member comprising two layers of metallic cords and a radial outer layer of heat shrinkable textile cords, the metallic cords of the two layers being inclined at an angle with the longitudinal direction of the tire and the cords of one layer crossing those of the adjacent layer, and the textile cords of the radial outer layer being inclined at an angle with the longitudinal direction of the tire of more than zero and smaller than the angle of inclination of the metallic cords of the radial inner adjacent layer.

The process for making such a tire comprises the steps of (a) forming a cylindrical radial carcass on an expandable tire building drum;

(b) expanding the drum to convert the carcass having a cylindrical configuration into a first toroidal configuration while the carcass is unvulcanized;

(c) applying a reinforcing member of the aforesaid structure and a tread band on the toroidal shaped carcass with the opposite ends of the textile cord layer being joined at an angle across the width of the layer which is inclined at substantially the same angle as the inclination of the cords in the immediately radially inner layer of metallic cords; and (d) molding and vulcanizing the assembly of carcass, tread and reinforcing member.

The invention also contemplates the product of the process which is a pneumatic tire having a radial carcass, a crown, a tread band on the external surface of the crown and an annular reinforcing member disposed between the tread band and carcass having two layers of metallic cords parallel to each other in each layer and oppositely inclined in adjacent layers with the longitudinal direction of the tire, and a radially outer layer of heat shrinkable textile cords also inclined at an angle with the longitudinal direction of the tire which is not zero but is smaller than the angle of inclination of the immediately radially inner layer of metallic cords.

The tensions of the cords of the two metallic belts are more uniform when the tire is made by the process just described.

One hypothesis which obviously may not be the only one possible and is not to be binding on the applicant for the purpose of the invention, is that this improvement depends upon the application to the carcass after toric shaping around that part of the reinforcing structure already applied, of a third layer of textile cords, inclined with respect to the longitudinal direction of the tire and with the joining line of the facing ends of the third layer having the same direction as the immediately underlying metallic cords.

In this case, the textile cords being inclined with respect to the longitudinal direction of the tire, and not being overlapped to each other in the portions facing the extremities for a wide tract, as was the case in the surmounting zone in the known process with textile cords disposed longitudinally, vary the original inclination, during the tire expansion in the steps of vulcanizing in the mold, permitting small settlings in the underlying metallic cords, and hence, favoring a uniform disposition with consequent improved characteristics in the finished tire.

Besides, in the finished tire, even small eventual non-continuities of the material, in the joining zone of the third layer, in being distributed according to the direction of the underlying metallic cords, prevent the formation of notable irregularities in the thicknesses having a localized concentration, as was verified in the past, and hence, this has the advantage of eliminating any annoying and intense periodic vibrations in the tire during its running.

Moreover, the cited process, due to the characteristic of joining the opposite ends of the third layer according to the direction of the underlying cords of the second layer, make it possible to prepare apart the second and third layers, and then apply them simultaneously on the toric carcass, thereby improving productivity, as, for that matter, will be clarified and explained in more detail further on in this text.

Preferably then, the process comprises in, successive order, the steps of:

applying on the carcass, that is shaped in a first toric configuration, the three layers;

then proceeding with a second toric conformation of the carcass with the three layers of the annular reinforcing structure;

then applying on the carcass, over the third layer of a second toric formation, a band of elastomeric material from which the tread band will be formed.

In this case, the textile cords subjected to the carcass expansions occurring respectively, during the passage from the first to the second toric configuration and in the mold, vary the inclination with respect to the longitudinal direction and gradually reduce the starting angle. Consequently, the metallic cords, in not being impeded in their movement by the overlying textile material, also tend to gradually reduce the angles of intersection in the longitudinal direction, with the shiftings that take place during the second toric conformation, until the termination of the manufacturing process in the mold.

This circumstance is still more evident if it is compared to what took place in the known manufacturing process described in Italian Pat. No. 1,017,287, wherein the cords of the two metallic layers, though variation in their angular configuration during the second toric conformation of the carcass, in a way that tends to distribute them uniformly, do not benefit all the same, from the controlling action for their gradual shifting and hence, for a more regular one, as takes place in the present preferred process, due to the presence of the overlapping layer of textile cords, which are free to shift slightly.

Still more particularly, in the tires of the prior art settling of the metallic cords when the carcass expands during the vulcanizing steps is substantially prevented, because the metallic cords in the vulcanizing step are surrounded by the overlying layer of textile cords disposed along the longitudinal direction. This provides in practice, an obstacle to said angular shiftings of the cords that contribute to further improving the uniformity of their distribution and hence, of the tensions at play.

The invention also provides a tire constructed by the process of the invention.

Referring now to the drawing, tire 1 of FIG. 1 has a radial carcass formed by a single layer 2 of cords, turned-up at their ends around the beads 3,4, a tread 5, and an annular reinforcing structure 6 inserted between carcass and tread band.

Annular reinforcing structure 6 (FIG. 2) comprises respectively, a first layer 7 of metallic cords that are parallel to each other and inclined at 20° with respect to the circumferential direction of the tire, a second layer 8 of metallic cords that are parallel to each other and inclined at an angle of 20° with respect to the circumferential direction of the tire and in the opposite direction relative to the cords of layer 7, a third layer 9 of cords in a textile material that shrinks in length when subjected to the effects of heat. The cords of layer 9 are parallel to each other and inclined at an angle of 10° with respect to the circumferential direction of the tire.

In the example of FIG. 1, the three layers, starting from the one innermost towards that radially outermost, decrease in width from the first to the third layer.

The invention can be practiced to manufacture tires having an angular inclination of the cords different from those visible in the figures, provided that however, for the reasons explained further on, the angles by the textile cords of the layer 9, are not zero and are preferably smaller than the angles formed by the metallic cords of the layer 8.

For example, the angles formed by the metallic cords, may be between 15° and 35° and for an angle of 20° the inclination of the textile cords of layer 9 can vary between 6° and 18°, an angle of 10° being preferable.

Preferably, cords 9 are nylon.

Figure 3:
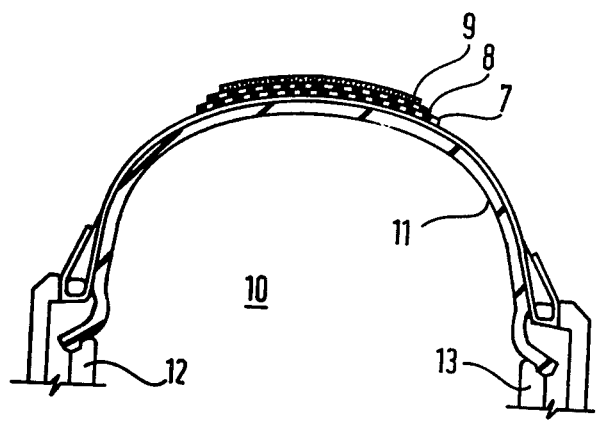
FIG. 3 illustrates in section a carcass after a first toroidal configuration has been imparted thereto.
Figure 4:
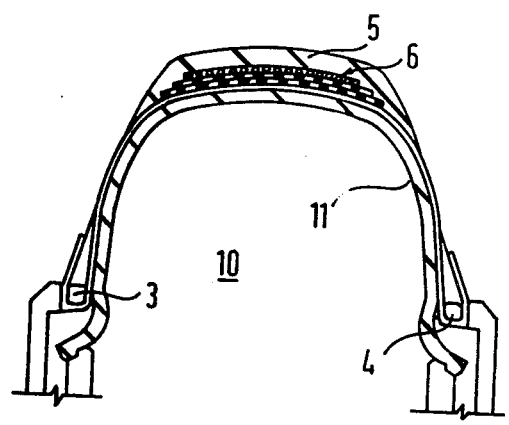
FIG. 4 illustrates in section a carcass after a second toroidal shaping step.

The equipment for constructing the tire of FIG. 1 is of the known type and comprises for example, a first flat cylindrical drum (not illustrated) for forming the carcass in a cylindrical configuration, with the application of the beads and turn-ups of the carcass plies around the beads, and a second drum 10 with a dilatable membrane 11, for imparting a toric conformation to the carcass by introducing pressurized air into the membrane, and at the same time, drawing closer the shoulders 12, 13 (FIGS. 3 and 4) wherein there are the seats for housing the beads in the carcass.

Lateral bells that can be drawn nearer with respect to the mid-plane of the drum for determining a seat for guiding and for applying said reinforcing layers on the toric carcass and a vulcanizing mold complete the equipment.

The process for manufacturing the tire 1 of FIG. 1, is as follows:

1. The carcass is constructed in a cylindrical form on an appropriate flat drum;
2. the carcass 2 is transferred from the flat to the expandable drum 2, and the first toric conformation of the carcass 2 (FIG. 3) is carried out;
3. successively, on the carcass, there is applied a first metallic layer 7, and over this is simultaneously applied a second metallic layer 8 and the third textile layer 9, that were pre-assembled.

Figure 2:
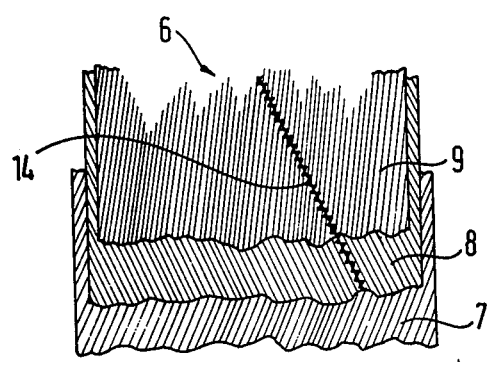
FIG. 2 is a plan view of a segment of the annular reinforcing member shown in FIG. 1.

As is pointed out and illustrated in detail in FIG. 2, the opposite edges of the layers 8 and 9, are joined end to end along the connecting line 14 inclined at 20° with respect to the circumferential direction of the tire parallel to the metallic cords of layer 8.

The layers 8 and 9, have been made, in practice, from two strips of endless lengths comprising metallic cords inclined at 20° and textile cords inclined at 10°, with respect to a common direction of advancement of the layers, hence, stopping the strips in two successive positions distinct from each other for a length equal to the outer maximum equatorial development of the carcass after the first conformation and then cutting the strips, in the two positions indicated, with a cutting line inclined at 20° with respect to the advancing direction.

In another step, the second toric conformation of the carcass 2 already having the three layers, is proceeded with, by permitting the metallic cords of the layers 7 and 8 to become settled, with their free movement controlled by the small angle variations to which the textile cords of the upper layer 9 are subjected. At the termination of this step, the tread-band is applied (FIG. 4) and the usual operations of rolling the tread, are carried out.

The thus constructed tire is introduced into a mold, where, following a further expansion, there is obtained the final arrangement of the metallic cords, always controlled by very small angular shiftings in the textile cords, and the molding of the tread-band.

As an alternative to the described process, the three belts can be pre-assembled to form a cylindrical sleeve having an internal diameter corresponding to the maximum equatorial development desired for the carcass of the first conformation, then allowing the carcass to pass from the cylindrical configuration to the first toric configuration, until the carcass crown is contacting the corresponding sleeve zone that is already disposed with its mid-plane aligned with the mid-plane of the expandable drum.

In this variation of the process, the remaining steps are similar to the steps already described.

The process of the invention is applicable, to advantage, for manufacturing tires on a commercial scale.

In fact, there has to be taken into account in the present case, that the simultaneous assembling of the second metallic layer and the third textile layer, as was previously explained, requires the manual intervention of an operator only in the step of placing the three layers onto the carcass that is already in the first toric configuration, and this circumstance is different to what occurs (according to the process described in the Italian Pat. No. 1,017,287) with textile layers having cords directed longitudinally (at 0°) in which the operator applies the two metallic layers on the carcass of the first conformation, and afterwards again in a second manual intervention, places the textile layer on the carcass of the second toric conformation.

As can be noted from what has been described, the present process requires fewer workers than the traditional process mentioned previously, and in practice, a cost which is substantially similar to that of manufacturing tires having only two metallic layers.

Besides this, the tires made by the process of the invention, comprises not only the optimum characteristics of resistance to the stresses of the tire's reinforcing structure with a textile layer having cords at 0°, but also improvements in tire performance.

To explain the equality in the behavior of the annular reinforcing structure with the effects of the stresses, a comparison can be made of the metallic structures of the two tires in question, to a network which is formed by lozenges originated from metallic cords criss-crossed together.

Figure 5:
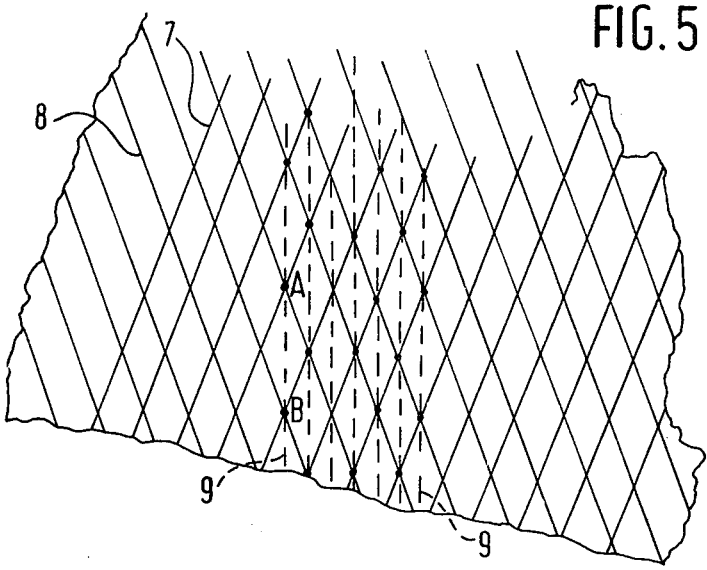
FIG. 5 is a schematic illustration of the network structure of an annular reinforcing member formed by a prior art process.

In the first instance, each textile cord 9 binds the opposite vertices A, B, of the same lozenge (FIG. 5), while in the second case, corresponding to the tire of FIG. 1, each textile cord (FIG. 6) binds, no longer the vertices of the same lozenge, but the vertices of other lozenges and among these vertices, also the opposite sides K, T, of a same lozenge.

Figure 6:
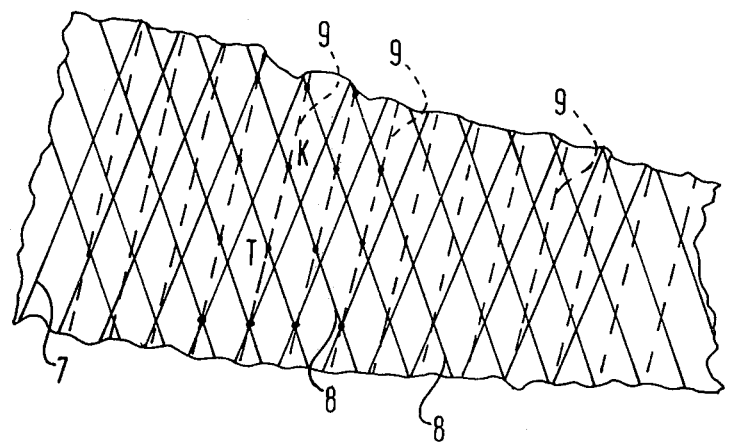
FIG. 6 illustrates schematically the network structure of the annular reinforcing structure provided by the invention.

Naturally, in the second case, the connecting of the cords will be had for the angles of the textile cords having diverse values to those formed by the underlying metallic cords since, for equal angles, as can be seen in FIG. 6, the intersection of the textile cords with the facing sides of a same lozenge is not verified.

However, in practice, in both these cases, the textile cords, that are preloaded elastically, as explained in the Italian patent, are elastically opposed to any whatsoever stresses that tend to draw apart the opposite vertices from one another, or the facing sides of a same lozenge, hence determining, in a practically similar way, an adequate resistance of the annular reinforcing structure to stresses.

As has already been stated, tires like those illustrated in FIG. 1, constructed by the process of the invention, present improved riding-comfort, when compared to tires having textile cords oriented longitudinally.

In fact, as is visible in FIG. 2, the third textile layer is placed in the carcass with a butt-end joining of the opposite edges, thus eliminating, with advantage, any periodic vibrations when the tire is running, because the typical discontinuity in thickness in the overlapped reinforcing textile layer is eliminated.

Although the invention has been described in detail for the purpose of illustration, it is to be understood that such detail is solely for that purpose and that variations can be made therein by those skilled in the art without departing from the spirit and scope of the invention except as it may be limited by the claims.

For example, the cords of layer 9 can be oppositely inclined with respect to the longitudinal direction, i.e. with reference to what is illustrated in FIG. 2, if the angle is considered as having a value of $+10°$, the invention is likewise applicable to textile cords forming an angle of $-10°$.

Even in this case, there would still have to be determined the previously cited bond determined by textile cords with the side opposite in a same lozenge originated by the cords of the two underlying metallic layers.

What is claimed is:

1. A process for making radial tires comprising a radial carcass, a tread, an annular reinforcing structure inserted between the carcass and the tread, the said annular reinforcing structure comprising at least two layers of metallic cords, and in a radially outermost position, a third layer of textile cords that shrink in length under the effects of heat, said metallic cords, of each layer being disposed parallel to each other and crossed with the cords of the adjacent layer, and forming an angle with the longitudinal direction of the tire, said textile cords being disposed parallel to each other and forming with the longitudinal direction of the tire an angle which is not zero but is smaller than the angle formed by the metallic cords of the second metallic layer, said process comprising the steps of:
   (a) constructing the radial carcass on a tire building drum;
   (b) shaping the carcass in its unvulcanized state into a toric configuration;
   (c) placing the reinforcing annular structure and the tread band on the toric shaped carcass; and
   (d) molding and vulcanizing the tire, said method being characterized by the fact of joining the opposite ends of the third layer of the annular reinforcing structure along a line which extends in the direction of and at substantially the same angle as of the metallic cords of the second metallic layer.

2. A process, according to claim 1 characterized by the fact of comprising, in successive order, the steps of:
applying onto the carcass after the first toric configuration, the said three layers;
proceeding with a second configuration of the carcass with the three layer of the annular reinforcing structure into a toric configuration; and
applying on the carcass over the third layer of a second toric formation a band of elastomeric material for forming a tread band.

3. A process, according to claim 2, characterized by the fact that the second metallic layer and the third textile layer, are assembled apart, with both the lines of the meeting ends of the third layer being coincident with those of the second layer which are parallel to the metallic cords and between two contiguous metallic cords, said facing ends of the second and third layers being joined together when said second and third layer are applied around the first metallic layer which was wound around the carcass in a first toric conformation.

4. A process, as in claim 2, characterized by the fact that the three layers of the annular reinforcing structure are constructed apart, and then assembled in the form of a cylindrical sleeve having a length that is equal to the maximum equatorial development of the carcass of the first conformation.

5. A process, as in claim 1, characterized by the fact of butt-joining said opposite ends of the third layer of said annular reinforcing structure.

6. A tire prepared by the process of claim 1 or 2.

7. In a process for making a pneumatic tire comprising forming a cylindrical radial carcass, transforming the cylindrical radial carcass into a first toroidal shape, assembling with the resulting first toroidal shaped carcass an annular reinforcing member, transforming the resulting assembly into a second toroidal shaped carcass and annular reinforcing member, assembling with said second toroidal assembly an elastomeric band from which a tread will be formed, and molding and vulcanizing the resulting toroidal shaped assembly under pressure to form a tire, the improvement which comprises the steps of assembling with said first toroidal shaped radial carcass an annular reinforcing member comprising first and second layers of metallic cords parallel to each other in each layer, the metallic cords of the first layer being disposed on a bias with respect to the longitudinal direction of the tire, the cords in the second layer being biased in a direction opposite from those of the first layer, and a third layer of heat shrinkable textile cords disposed radially outwardly of the said first and second layers, the said heat shrinkable cords being parallel to each other and biased in a direction corresponding to the bias of the cords of said first layer, said third layer being a band wound around the carcass and underlying layers with its ends abutting along a line, across the width of the layer, which is disposed in a plane substantially parallel to the plane of the cords of the said second layer, and along a direction parallel to the direction of the metallic cords of said second layer.

8. A pneumatic tire for a motor vehicle wheel comprising a radial carcass, a tread and an annular reinforcing member disposed between the tread and carcass having first and second layers of metallic cords, the cords of the first layer being disposed at an angle with respect to the longitudinal direction of the tire and the cords of the second layer being disposed at an angle with the longitudinal direction of the tire in a direction opposite to the direction of the cords of the first layer, and a third radial outer layer of cords consisting essentially of heat shrinkable textile cords parallel to each other and disposed at an angle which is not zero but is smaller than the angle of inclination of the cords in the immediately adjacent layer of cords, whereby the cords in the second layer cross the cords of the first and third layers, said third layer being a band of cords wound around the carcass with its ends abutting in a line which is disposed across the width of the third layer in the same direction and at substantially the same angle as the cords are disposed in the said second layer.

* * * * *